D. DOREMUS.
Animal-Traps.
No. 146,887. Patented Jan. 27, 1874.
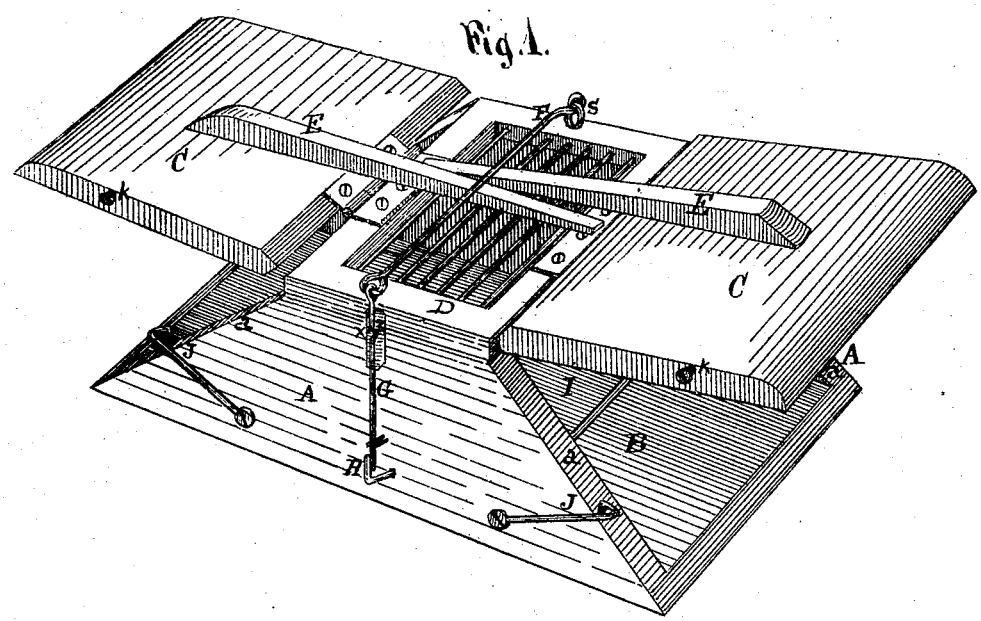
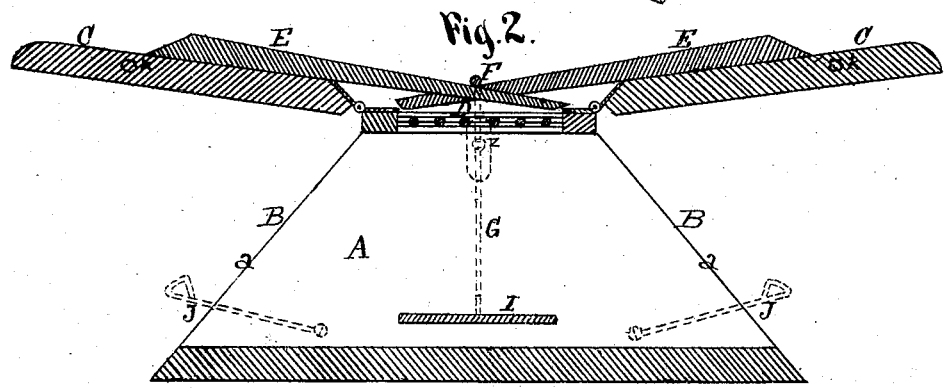
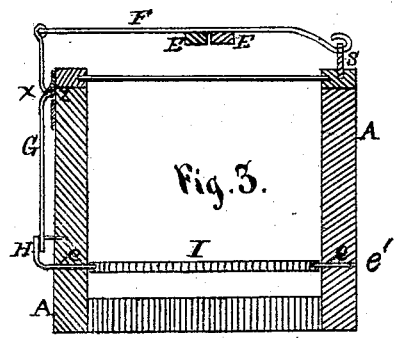
Witnesses: Alex. Selkirk, Geo. A. Thompson
David Doremus, Inventor.

UNITED STATES PATENT OFFICE.

DAVID DOREMUS, OF ALBANY, NEW YORK, ASSIGNOR OF ONE-HALF HIS RIGHT TO DAVID H. MATHIAS, OF SAME PLACE.

IMPROVEMENT IN ANIMAL-TRAPS.

Specification forming part of Letters Patent No. 146,887, dated January 27, 1874; application filed March 24, 1873.

*To all whom it may concern:*

Be it known that I, DAVID DOREMUS, of the city and county of Albany, State of New York, have invented an Improved Animal-Trap; and I do hereby declare that the following is a description thereof, reference being had to the accompanying drawings forming a part of this specification, in which—

Figure 1 represents a perspective view of the trap embodying the improvements in this invention. Fig. 2 is a sectional elevation of the same. Fig. 3 is a cross-sectional view of the same.

My invention relates to a box trap for catching animals; and consists, in one part, of forming the open ends or mouths with a slope, and combining with the same weighty falling doors, in such a manner that the said doors will readily close over the said sloping mouths without the aid of any springs or similar adjuncts. Another part consists in the combination of a tripping-table, trigger, trigger-catch, binding-bar, and holding-lip with the levers of the dropping doors, in such a manner that the said tripping-table, with the trigger, trigger-catch, binding-bar, and holding-lip, will operate to hold the doors open, and permit the same to instantly fall when moved in the least. Another part consists in the combination of a catch with the inclined closing doors and body of the trap, in such a manner that when the said doors fall they will be instantly secured in a reliable manner.

To enable others skilled in the art to make and use my invention, I will proceed to describe it in reference to the drawing and the letters of reference marked thereon, the same letters indicating like parts.

In the drawings, A A represent the body of the trap. B B are the mouths or open ends of the same, which mouths, when unclosed by their covers, will present an unobstructed passage through the trap. The said mouths are made with inclined or sloping edges $a\ a$, as shown. C C are the doors of the trap, hinged to the top piece D in any proper manner, so as to permit the said doors to quickly fall. The said top piece is made, preferably, grated, or with open-work, as shown in Fig. 1, so as to permit a view into the trap when closed.

Secured in a firm manner to the doors C C are the levers E E, the long ends of which are made with a length from the said doors sufficient to reach past the center of the top piece D, as shown. The mouths of the trap, being constructed so that both will be unclosed at the same time, give an inducement for the animal to attempt a passage through the same, and, being made with sloping form, and provided with the hinged covers, the said covers will have the full action of their weight to cause the same to quickly fall, which full action of gravity could not be had with covers falling to about a perpendicular position, as have been before used.

To hold the said doors open when the trap is set, I use the bar F, which is pivoted to the staple $s$ in a free manner, at one end, while to the opposite end is jointed the trigger-catch G, which is provided in its upper part with the projection $x$, Figs. 1 and 3, which engages with the holding-lip $z$, secured to the side of the trap, as shown, when the said trigger-catch is pressed and held in position by the trigger H, operating with the lower end of the same, as in Figs. 1 and 3. The said trigger is formed substantially as shown in Fig. 3, and its horizontal part $e$ is made to serve as a shaft or pivot, with the pivot $e'$, to swing the tripping-table I, which table has a horizontal position when the trap is set, as in Fig. 2. By this part of my invention, when the bar F is thrown across the levers E E of the doors C C, the said doors will be raised; and, when the trigger-catch is placed in position, with its projection $x$ engaging with the holding-lip $z$, the said lip $z$ and projection $x$ will bind the said binding-bar down over the levers E E, and hold the doors open. When the tripping-table I is made to assume a horizontal position, so as to bring the trigger H, secured to the same, to an upright position, in order to engage with the face of the catch G, the said trigger will retain the projection $x$ in a feeble engagement with the holding-lip $z$, and the least movement of the tripping-table from a horizontal position will cause the trigger H to throw off from contact with the trigger-catch, and permit the projection $x$ to release its hold with the holding-lip $z$, and thereby relieve the levers E E from the pressure of the binding-bar F, and permit the doors to close. To hold the doors securely closed when an animal has been taken in the trap, I provide, on one or both sides of the trap, for each cover, the spring-catches J J and the holding-pins K K, Fig. 1, which will instantly engage when the covers fall, and securely lock the same fast to the body of the trap.

This trap is very simple in its parts, and can be used without bait when placed in the path or usual track of the animal sought to be caught, or at the entrance of its burrow; and, when employed to catch animals which travel in no particular path or line of route, bait may be suspended over the tripping-table from the grated top above; and it is intended that this trap will have its size proportioned to the class of animals to be taken, whether it be for mice, rats, minks, rabbits, foxes, or other animals.

Having described my invention, what I claim, and desire to secure by Letters Patent, is—

1. In combination with the body A and the levers E E of the doors C C, the binding-bar F, trigger-catch G, made with the projection $x$, holding-lip $z$, trigger H, and tilting-table I, when said parts are arranged substantially as and for the purpose set forth.

2. The combination of the spring-catches J J, secured to the body A of the trap, and holding-pins K K, secured to the doors C C, the latter hinged to the top piece D, and lying in a sloping position when closed, substantially as and for the purpose set forth.

DAVID DOREMUS.

Witnesses:
ALEX. SELKIRK,
GEO. A. THOMPSON.